Jan. 19, 1926. 1,569,917

H. A. FOOTHORAP

MULTIBILLING PLATEN EQUIPMENT

Filed August 24, 1921   8 Sheets-Sheet 2

Inventor,
Harry A. Foothorap.
By
Attorney

Jan. 19, 1926.  1,569,917
H. A. FOOTHORAP
MULTIBILLING PLATEN EQUIPMENT
Filed August 24, 1921   8 Sheets-Sheet 4

Inventor,
Harry A. Foothorap
By
Attorney

Jan. 19, 1926.    1,569,917
H. A. FOOTHORAP
MULTIBILLING PLATEN EQUIPMENT
Filed August 24, 1921    8 Sheets-Sheet 5

Jan. 19, 1926.

H. A. FOOTHORAP

MULTIBILLING PLATEN EQUIPMENT

Filed August 24, 1921  8 Sheets-Sheet 6

Inventor,
Harry A. Foothorap.

By

Attorney

Jan. 19, 1926. 1,569,917
H. A. FOOTHORAP
MULTIBILLING PLATEN EQUIPMENT
Filed August 24, 1921   8 Sheets-Sheet 8

Inventor,
Harry A. Foothorap.
By
Attorney

Patented Jan. 19, 1926.

1,569,917

UNITED STATES PATENT OFFICE.

HARRY ARTHUR FOOTHORAP, OF HARRISBURG, PENNSYLVANIA, ASSIGNOR TO ELLIOTT-FISHER COMPANY, A CORPORATION OF DELAWARE.

MULTIBILLING PLATEN EQUIPMENT.

Application filed August 24, 1921. Serial No. 494,943.

*To all whom it may concern:*

Be it known that HARRY A. FOOTHORAP, a citizen of the United States, residing at Harrisburg, in the county of Dauphin and State of Pennsylvania, has invented certain new and useful Improvements in Multibilling Platen Equipment, of which the following is a specification, reference being had therein to the accompanying drawing This invention relates to a manifolding platen for typewriting machines and is directed, more particularly, to the novel construction and equipment of the platen of a typewriter of the flat platen class.

The object of the invention, stated generally, is to produce an extremely simple and highly efficient platen for various classes of work and more particularly what has come to be known as muti-billing or multiple continuous form writing.

To the accomplishment of this object, and others subordinate thereto, as will appear more fully, one embodiment of the invention resides in the construction and arrangement of parts to be hereinafter described in detail, illustrated in the accompanying drawings and defined in the appended claims.

1 indicates the platen frame, including longitudinal side members 2 and 3; transverse members 4, 5 and 6 extending between the side members 2 and 3, and a pair of longitudinal platen guides 7 and 8 extending between the frame members 1 and 5 and spaced somewhat from the side members 2 and 3. The side members 2 and 3 are surmounted by combined tracks or guides 9 and 10 upon which moves, in a manner well understood in the art, the line space frame of the typewriter.

It may be mentioned in passing that in the type of machine with which this invention is more particularly concerned, the line space frame traverses the guides 9 and 10 and supports the carriage which moves transversely of the platen and is equipped with downwardly acting printing mechanism and the various other appurtenances of a typewriting machine.

Figure 5:
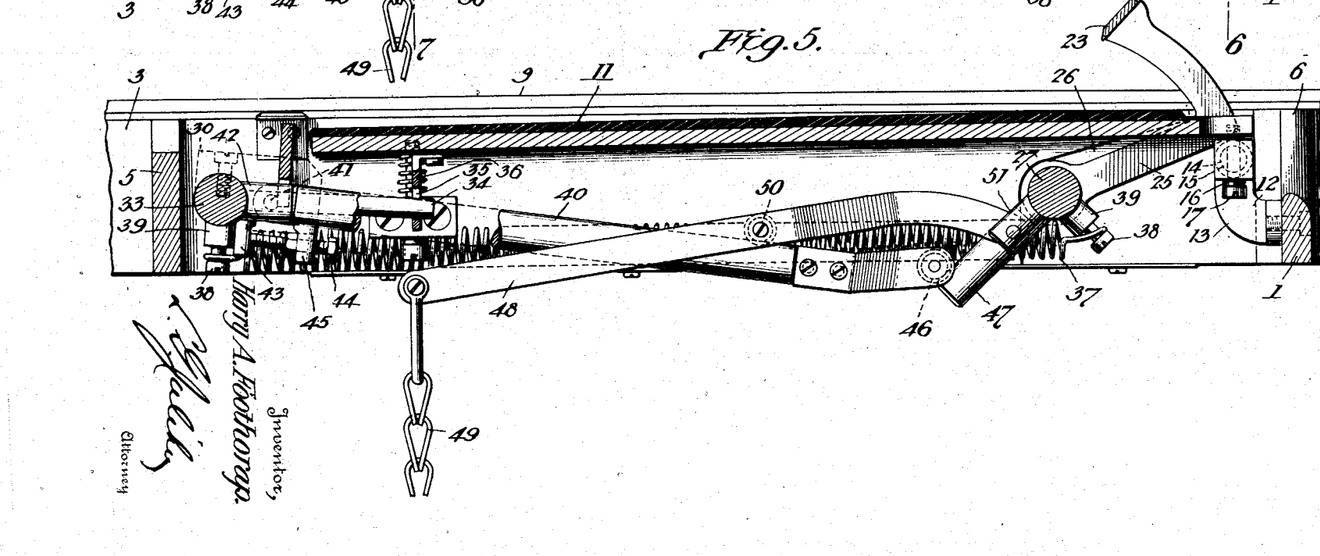
Figure 5 is a similar view with the clamps moved to their releasing position.
Figure 6:
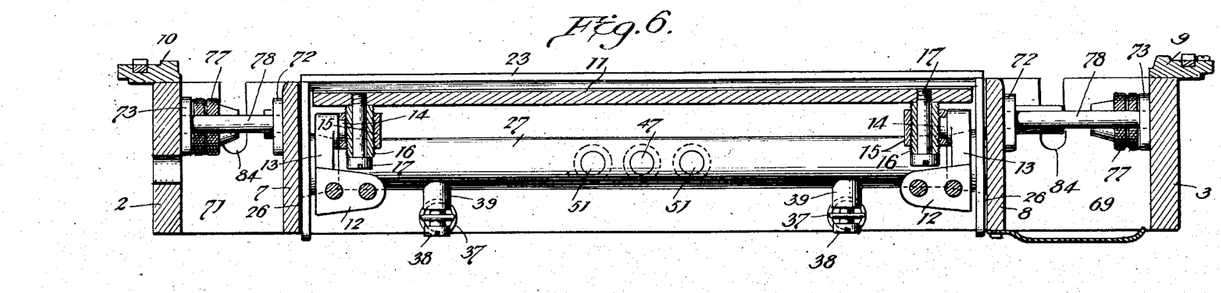
Figure 6 is a transverse section on the line 6—6 of Figure 4.
Figure 7:
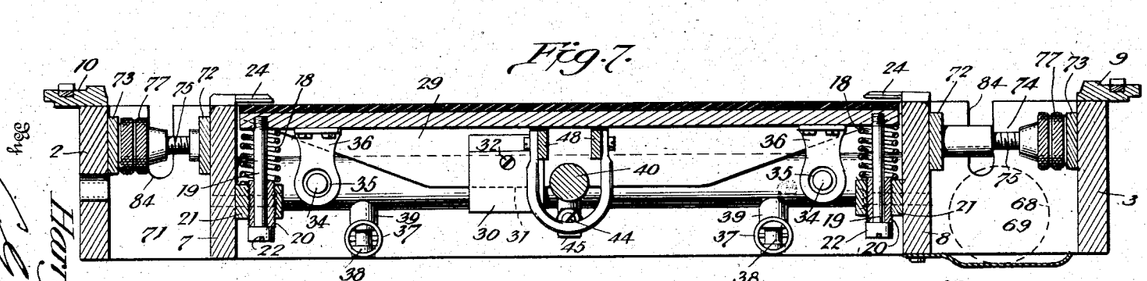
Figure 7 is a similar view on the line 7—7 of Figure 4.
Figure 8:
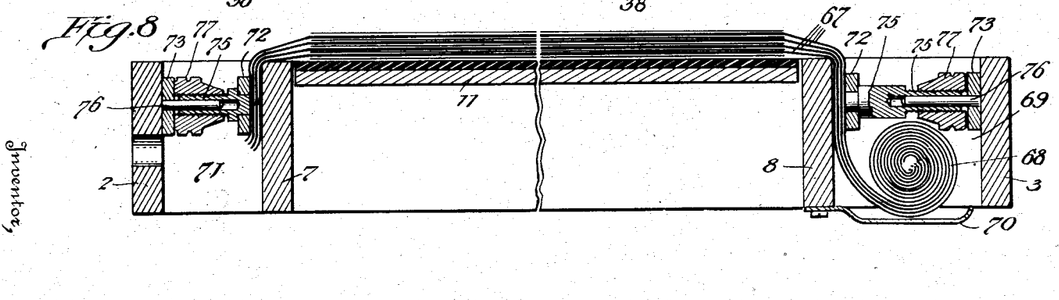
Figure 8 is a transverse section designed, more particularly, to show the transverse carbons and the arrangement of the carbon clamps.

The platen proper 11 is in the form of a flat plate covered with rubber, or other suitable material, and is located between the guide members 7 and 8 and terminates short of the members 5 and 6 of the frame structure. In certain aspects of the invention, it is immaterial whether or not the platen is fixed to its supporting frame. Other aspects of the invention contemplate the movement of the platen proper toward and from the writing plane. I have therefore shown a platen mounting which contemplates this movement. At its front edge, the platen 11 is hinged to the supporting frame by hinges 12. These hinges may be varied within wide limits, but preferably include provision for the easy assembling of the parts and for slight adjustment of the platen relative to its axis of movement. As shown, each hinge comprises a bracket 13 from which extends a trunnion 14 into a block 15 through which is screwed a bushing 16 upon which the platen rests and by means of which the platen may be adjusted slightly relative to the block. The securing screw 17 is passed through the bushing 16 and screwed into the platen, as shown in Figure 6. At its opposite or rear end, the platen 11 is yieldingly supported by springs 18 encircling vertical guide rods 19 depending from the platen and passed through adjustable bushings 20 in guides 21 carried by the frame members 7 and 8, as shown in Figure 7. The guide rods 19 are provided with heads 22 at their lower ends and limit the upward movement of the platen by engagement with the lower ends of the bushings 20. It will be noted that this character of supporting structure does not permit extended movement of the platen, but by comparing the positions of the platen in Figures 4 and 5, it will be seen that its movement from the writing plane is slight, and can be easily accommodated.

Figure 4:
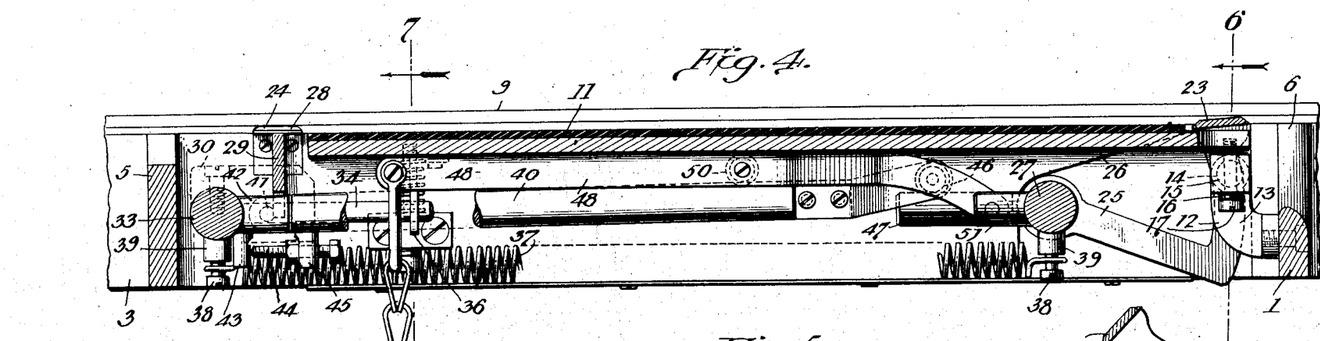
Figure 4 is a longitudinal section of the front end of the platen on a somewhat enlarged scale with the parts in normal position.
Figure 9:
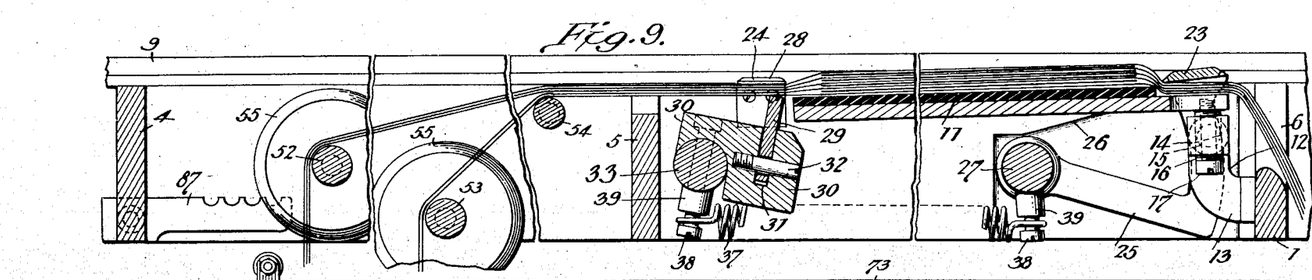
Figure 9 is a longitudinal section, broken away at intervals, and showing, more particularly, the relation of the paper and carbon to the paper holding clamps.

Associated with the platen are front and rear paper clamps 23 and 24. The front clamp 23 is in the form of a plate extending transversely over the platen at its front end and preferably serrated along its longitudinal edges, as shown. This clamping plate is carried by angular arms 25 accommodated by recesses 26 in the members 7 and 8 and secured to a transverse rock shaft 27. The shaft 27 is afforded suitable bearings in the frame members 7 and 8 and may be oscillated to move the clamp 23 toward and from its effective clamping position. (Compare Figures 4 and 5.) The rear clamp is of open throat construction and consists of two clamping plates 28 carried by the members 7 and 8 and extended inwardly therefrom immediately in rear of the platen proper 11. Coacting with the plates 28 is a clamping bar 29, the ends of which underlie the plates 28. The bar 29 is carried by a block 30 having an open sided slot or seat 31 for the edge-wise reception of the bar 29. The bar does not extend quite to the bottom of the seat and is secured in place by a pin 32 screwed into the block, and passed through the bar, as shown in Figure 9. This character of mounting provides for slight compensating movement of the bar 29 which may rock slightly on the pin 32 to accommodate itself to the paper sheets interposed between the clamping bar 29 and the plates 28. The block 30 is fixed to a second transverse rock shaft 33 similar to the shaft 27, but located beyond the rear end of the platen. Obviously, by rocking the shaft 33, the rear clamping bar 29 may be elevated to its clamping position or depressed therefrom, as shown in Figures 4 and 5. See also Figure 9.

Figure 3:
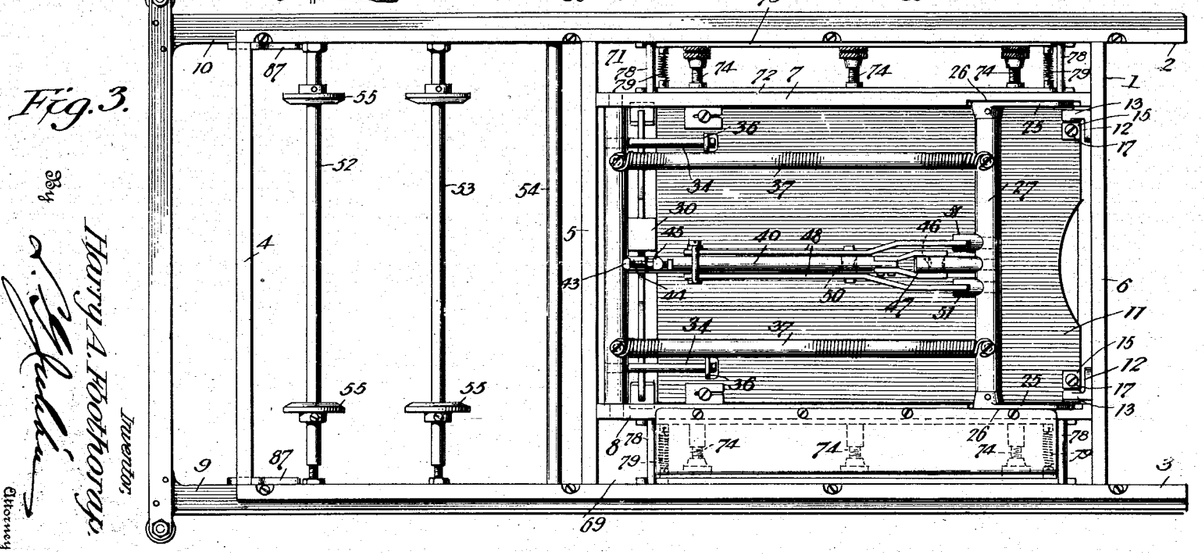
Figure 3 is a bottom plan view thereof.

It will now appear that the operation of the front and rear clamps 23 and 24 is effected by rocking the shafts 27 and 33. The movement of the platen from the writing plane, to facilitate the feeding adjustment or replacement of the work, is effected by the rocking of the shaft 33. This end is attained by extending forwardly from the rear rock shaft 33 a pair of platen depressing arms 34, the ends of which extend through comparatively large apertures 35 in brackets 36, secured to and depending from the platen (see Figures 3 and 7). In the normal positions of the parts, the arms 34 are practically centered in the apertures 35, the enlargement of which provides for limited movement of the arms 34 with the rock shaft 33 before the brackets are engaged and the platen is depressed by continued movement of the arms. In normal position (see Fig. 4) the front and rear paper clamps are closed and the platen is located in elevated position, or in other words, in the writing plane. These positions of the parts are maintained with certainty by a pair of powerful springs 37 extended between the rock shafts 27 and 33 (see Figs. 3, 4 and 5) and having their ends secured as by screws 38 to short arms or projections 39 extended laterally from the two rock shafts. Obviously, the springs 37 resist any movement of the rock shafts and the parts associated therewith from normal position and serve to retract the shafts and associated parts when unopposed by a superior force.

The manner in which such superior force is exerted, in opposition to the springs 37 to open the clamps and drop the platen will now be described. Projecting forwardly from the shaft 33, is an arm 40 hinged at its rear end as indicated at 41 to a projection 42 on the shaft 33. The arm 40 is intended to have very limited movement from the hinge 41 and to thereafter compel, through its continued movement, the rocking of the shaft 33. This end is attained by providing the projection 42 with a contact lug 43 and the rear end of the arm 40 with an adjustable contact screw 44, passed through and carried by a lug or projection 45 on the arm 40. By reference to Fig. 4, it will be seen that normally the screw 44 is out of contact with the projection 43. The arm 40 may therefore be depressed until such contact is effected, at which time a rigid connection will be established between the arm 40 and the rock shaft 33 so that further depression of the arm 40 will necessarily result in the rocking of the shaft. At its forward end, the arm 40 is provided with a bearing roller 46 which bears upon an arm 47, projecting rearwardly from the front rock shaft 27. This arrangement is effected to permit the initial downward movement of the arm 40, independently of the rear rock shaft 33 and the parts associated therewith, to rock the front rock shaft and effect the material elevation of the front clamp before the rear clamp or platen are disturbed. As soon, however, as the arm 40 has been depressed a sufficient distance to bring the screw 44 into contact with the projection 43, continued movement of the arm will serve to rock the shaft 42. The first result of this rocking movement will be the depressing of the rear clamping bar 29 and the consequent release of the rear paper clamp. During this operation, the platen will remain undisturbed because the platen depressing arms, moving with the shaft 33, will be absorbing the lost motion between said arms and the brackets 36. As soon as a predetermined movement of the rear clamp has been accomplished, however, the platen depressing arms will engage the brackets 36 and continued downward movement of the arm 40 will swing the platen downwardly away from the writing plane on the hinges 12 as an axis and in opposition to the platen supporting springs 18. Obviously, the front clamp will continue to move up during the movement of the rear clamp and platen. The rear clamp will continue to move down as the platen is depressed. So far, however, as the effective movements of the parts are concerned, they are timed to first release the front paper clamp, then release the rear paper clamp and then to drop the platen.

This timing of the operation is a distinct feature of the present invention and accomplishes an important subordinate object thereof. The retention of the sheets by the rear clamp until they have been grasped by the operator and put under tension eliminates, in considerable degree, if not wholly, the air pocketing which is usually incident to the handling of a number of sheets and materially interferes with the operation of manifolding. Furthermore, since the described timing of the operation will be reversed as the parts are being retracted, it will be seen that when a new set of forms has been drawn over the platen, the platen will be first restored to normal position, the sheets will be clamped at the rear end of the platen and securely retained while the operator, by a swift movement of the hand over the sheets, expels the air and drops the front clamp into place, if indeed, the described precaution is ever necessary under the operating conditions of this structure.

The manner in which power is applied to the arm 40 may be varied within wide limits, but I have shown an operating lever 48 connected at its rear end as by a chain 49 to any suitable source of power, as for instance, the treadle, ordinarily employed in connection with machines of the character under discussion. At an intermediate point the lever 48 is provided with a roller 50 which bears upon the arm 40, and the front end of the lever, which is of twin plate construction, is hinged to projections 51 extended rearwardly from the front rock shaft 27. By depressing the treadle, the lever 48 is swung down to depress the arm 40 and thus operate the clamps and platen, in the manner described, against the resistance of the retracting springs 37 and the platen supporting springs 18. Upon the release of the treadle, the parts are returned to normal position under the retractile force of the springs referred to. The material extension of the tracks and frame structure back of the platen not only provides for the shifting of the machine away from the platen to facilitate the inspection and manipulation of the work, but also accommodates, in rear of the platen, various instrumentalities for the guiding and guarding of the paper strips as they pass from a suitable source of supply to the writing area of the platen.

In multiple continuous form writing for which the illustrated construction is primarily designed, the paper comes in continuous strips of printed or unprinted connected forms. These are sometimes delivered to the user on multiple wound rolls or are folded back and forth in cartons or are furnished in single wound rolls. In some classes of work where one or more of the paper strips is designed to receive the printed matter, which is not to appear on either of the copies, strips of different widths are utilized, as for instance, one or more narrow strips imposed upon one or more wide strips. In other cases, it is desirable to utilize a plurality of strips or sets of strips in parallel relation. In other instances, the strips are what are known as fan-folded along opposite longitudinal folds which results in continuous series of forms arranged in connected sets folded oppositely one over the other.

Figure 1:
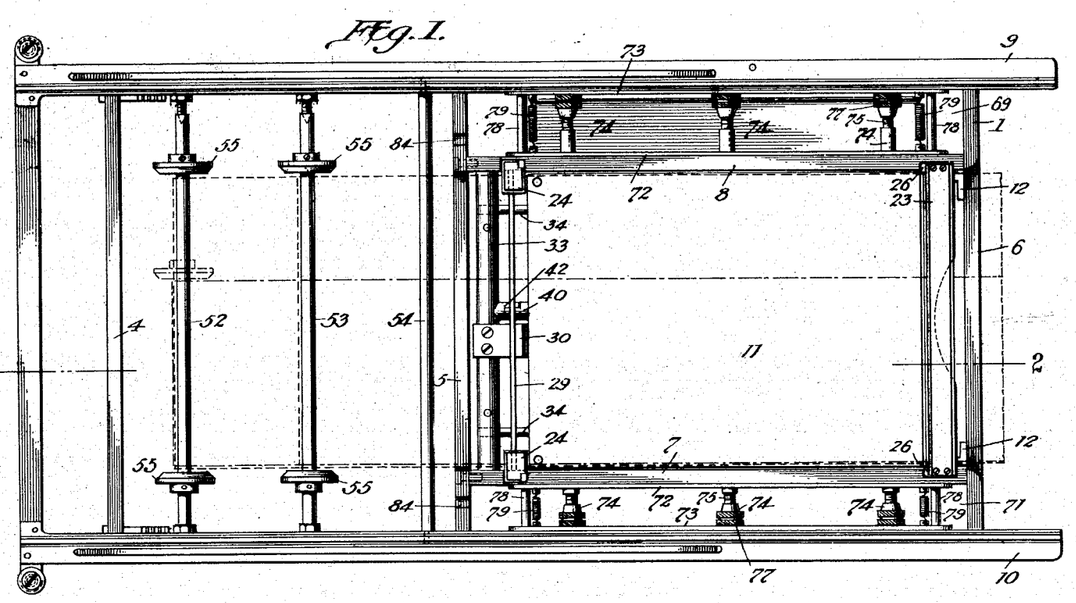
Figure 1 is a top plan view of an Elliott-Fisher platen constructed, arranged and equipped in accordance with my invention.
Figure 2:
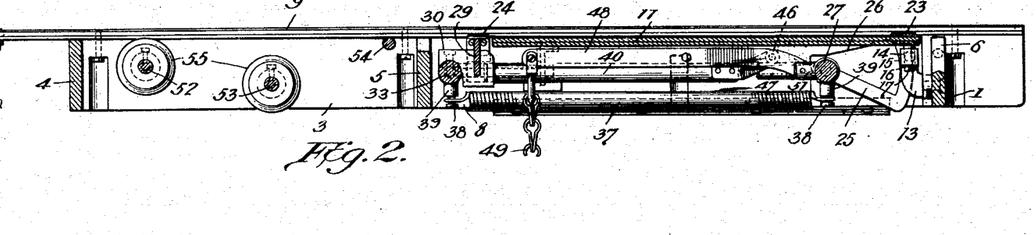
Figure 2 is a longitudinal section on the line 2—2 of Figure 1.

The present invention contemplates the efficient handling of these various classes of work and contemplates either the use of transverse carbons, or of what are known as floating longitudinal carbons in certain instances, as will be more fully described. In Figs. 1, 2, 3, and 9 I have shown idlers 52, 53, 54 extended between the side members 2 and 3 of the frame structure in rear of the transverse member 5. All of these idlers are demountable when they are not adapted to the particular work in hand. The idler 54 is located in substantially the same horizontal plane as the writing surface and around it are laid all of the paper strips which are guided to it by the other idlers 52 and 53. The latter idlers are preferably provided with adjustable flanges 55 which may be located so as to properly embrace and guide strips of any particular width which may be passed over the idler. If all of the strips are the same width, the flanges of both idlers are uniformly located, as shown in Fig. 1. If, however, certain of the strips are narrower than the others they may be guided over one of the idlers, the flanges of which will be accordingly adjusted, all of which will be obvious from an inspection of Fig. 1 of the drawings. In like manner, if parallel narrow strips, or parallel sets of narrow strips are utilized, the flanges of the respective idlers may be adjusted to accommodate them so that separate sets of forms may be in position on the platen at the same time.

Figures 10, 11:
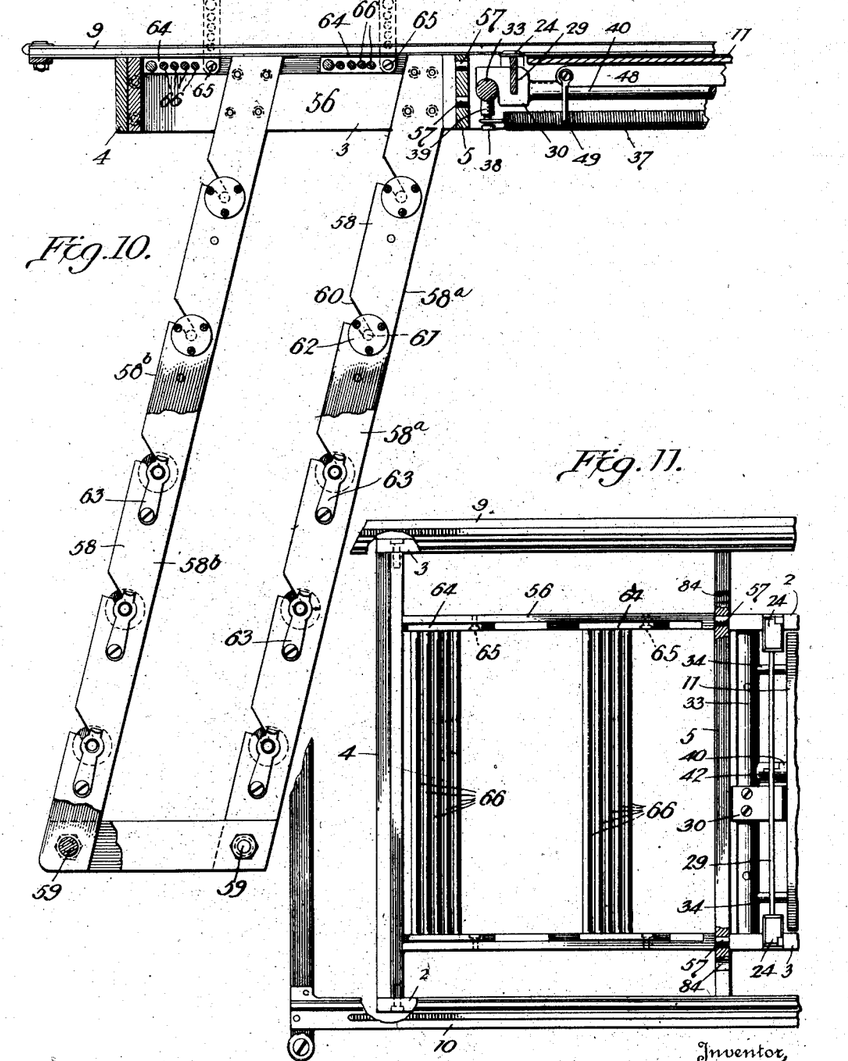
Figure 10 is a section of the rear end of the structure with the paper roll rack and guides in position for use.
Figure 11 is a plan view of Figure 10.

In Figs. 10 and 11 I have illustrated an arrangement of the platen for the handling of paper webs or strips received from rolls. This roll supporting attachment comprises a frame 56 which fits between the transverse members 4 and 5 of the frame structure and is provided with dowels 57 which extend into apertures in the bar 5. From this frame 56 depends a roll rack consisting of a pair of substantially oblong sides 58 spaced apart to accommodate the rolls connected at their lower ends by tie rods 59 and having a downward and rearward inclination to dispose the rolls out of vertical coincidence. Each of these said frames 58 includes front and rear members 58ª and 58ᵇ and extending at a downward inclination from the rear edge of each member are a series of open ended slots or seats 60 for the reception of the trunnions 61 at the ends of the spools 62 upon which the paper rolls are wound.

The trunnions extend slightly beyond the outer faces of the members 58ª and 58ᵇ and are engaged by spring latches or keepers 63 secured at their lower ends and adapted to have their upper apertured ends sprung into and out of engagement with the spool trunnions to retain the spools in place as the rolls are unwound. In rear of the upper end of each series of rollers, the frame 56 is equipped with an idler frame 64 mounted to swing from its front end 65 and carrying a set of idlers 66 corresponding in number to the subjacent series of paper rolls. In the present instance, two of these idler frames are provided because there are two substantially vertical series of rolls, and five idlers are provided in each frame because there are five rolls in each series. Obviously, however, the number of series or sets of rolls and the number of idler frames may be varied, and in like manner the number of rolls in each set and the number of idlers in each frame is immaterial. Normally, the idler frames occupy horizontal positions, as shown in Fig. 10, but to facilitate the threading of the paper strips over the idlers, the frames may be elevated, as indicated in dotted lines in Fig. 10, and again dropped to their normal positions after the paper has been threaded.

The carbons, or transfer webs 67 are preferably led across the platen from a multi-wound carbon roll 68 which is dropped into a carbon roll pocket 69 formed between the frame bars 2 and 7 and having a bottom or roll support 70. The ends of the carbons are carried into a similar pocket 71 formed between the frame members 3 and 8, the bottom being unnecessary and consequently omitted.

At this point it is proper to say that another of the subordinate objects of this invention is to provide a simple and efficient means for securely holding the carbons in place in a manner to permit their proper manipulation with accuracy and certainty. This means comprises a pair of carbon clamps, one of which is located in each of the pockets 69 and 71 to clamp the carbons securely against the outer walls of the frame members 7 and 8. Each of these clamps comprises a pair of parallel bars 72 and 73 and three intermediate spreaders 74 of identical construction. Each of these spreaders includes interfitting members 75 and 76, secured respectively to the bars 72 and 73, and a member 77 by means of which the extent of the interfitting relation may be varied to spread the bars 72 and 73 apart, or to bring the same in closer relation. In the illustrated instances, the member 75 is in the form of a hollow screw and the member 76 is a pin extended therein. The adjusting member 77 is in the form of a knurled nut screwed upon the screw 75 and bearing against the bar 73. When the carbons are in place, the clamps are dropped into the pockets and by turning the nuts 77 of the several spreaders the clamps may be spread in a manner to insure the proper clamping of the carbon. In like manner the reverse operation of the spreaders will loosen the carbon and permit the clamps to be readily withdrawn. To prevent the spreaders from dropping too far, they are provided with notched ends which engage transverse clamp supporting bars 78 in each of the carbon pockets. The contraction of the carbon clamps when the manipulation of the nut 77 permits, is insured by springs 79 extending between the bars 72 and 73 adjacent to each end of each clamp.

Figure 12:
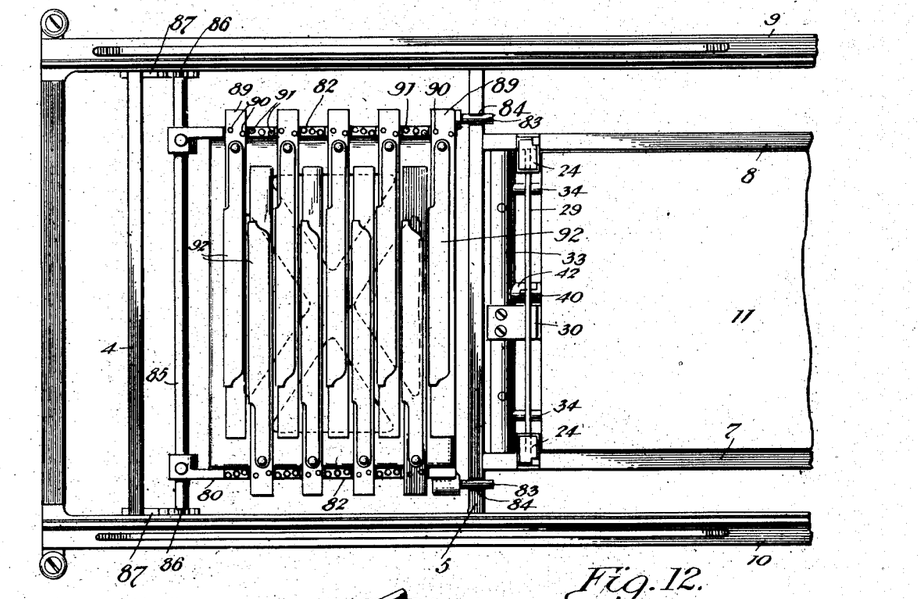
Figure 12 is a plan view of the rear end of the structure showing the carbon supporting frame in place and equipped with carbon holders arranged for use in connection with floating carbons and fan fold forms.
Figure 13:
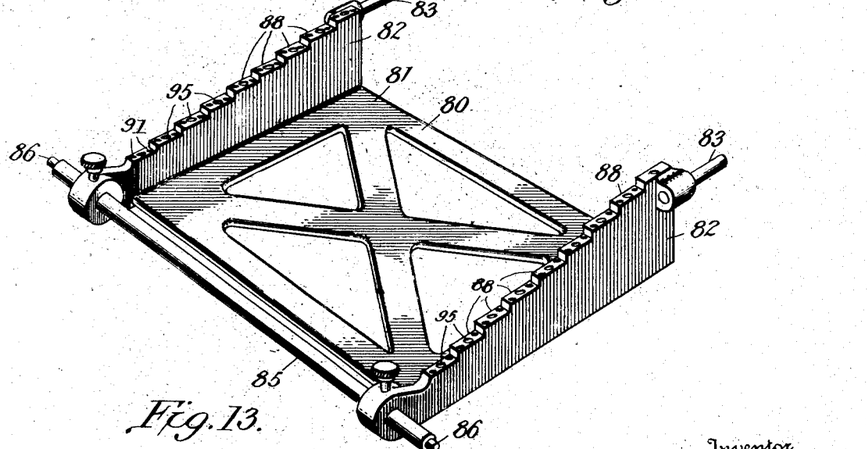
Figure 13 is a detailed perspective view of the frame of the carbon holder.

In Figs. 12 and 13 is illustrated a variation of the platen equipment for the accommodation of strips which are folded in opposite directions along longitudinal folds. In this arrangement, a carbon frame 80 is accommodated between the side members of the frame in rear of the transverse frame bar 5. The carbon frame 80 may be in the form of a casting, consisting of a skeleton bottom 81 and side members 82. Extending forwardly from the members 82 are supporting pins or dowels 83 dropped into notches 84 in the bar 5. A supporting bar 85 is passed through the rear ends of the members 82 and has reduced ends 86 received by notched rests 87 secured to the inner faces of the frame members 2 and 3. The bottom 80 of the carbon frame occupies a substantially horizontal position, but the upper edges of the side members 82 are stepped downward from front to rear to produce a series of carbon bar supports 88 in different horizontal planes (see Fig. 13). The carbon supporting bars 89 are comparatively thin metal strips extended alternately in opposite directions from the side members 82 of the carbon frame and secured at one end by a pair of studs or pins 90 carried by the bar and extended into openings 91 in the supporting seat. These bars are of insufficient length to extend entirely across the frame and are supported at one end only since each of these bars is designed to extend into the open side of the folded strip, and must of necessity terminate short of the closed side or fold thereof. Obviously, transverse carbons cannot be utilized with these longitudinally folded strips, and each of the carbon bars 89 is therefore equipped with a carbon clamp 92 for the retention of the rear end of a floating carbon which extends forwardly within the fold of the strip to the writing area of the platen for the purpose of transferring the matter printed on the upper layer of the strip to the subjacent layer or layers thereof.

Figure 14:
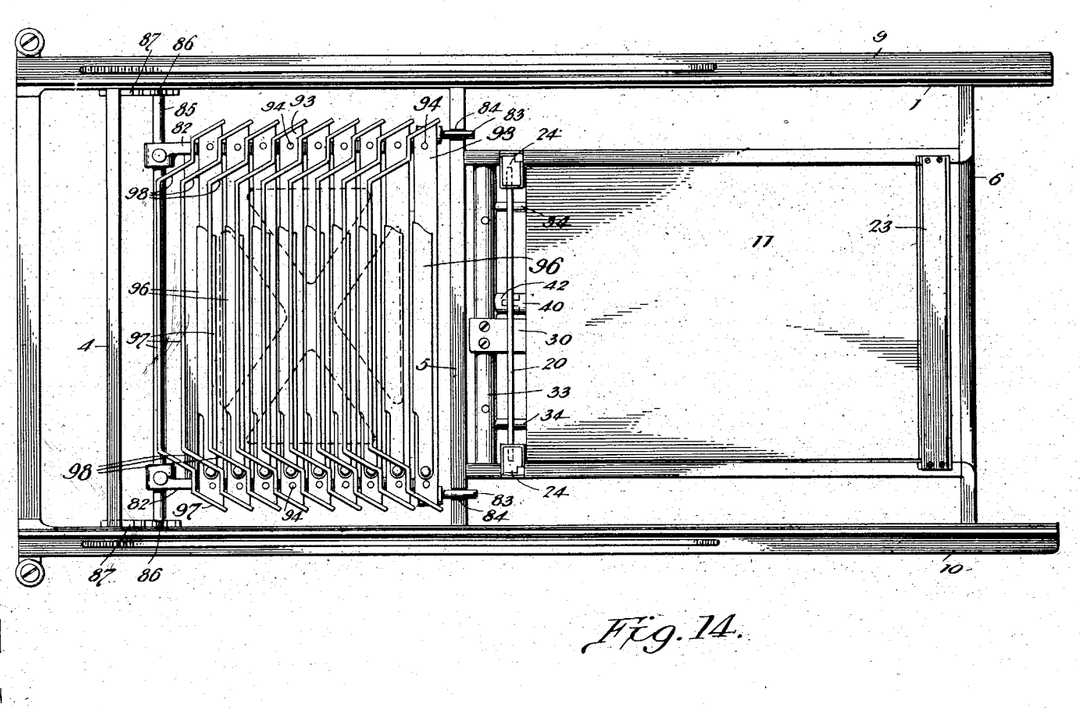
Figure 14 is a plan view of the platen structure having the carbon holding frame in use, but supporting the carbon holders and strippers designed for use in connection with fan fold forms which are to be stripped or severed before passing to the writing position.
Figures 15, 16, 17:
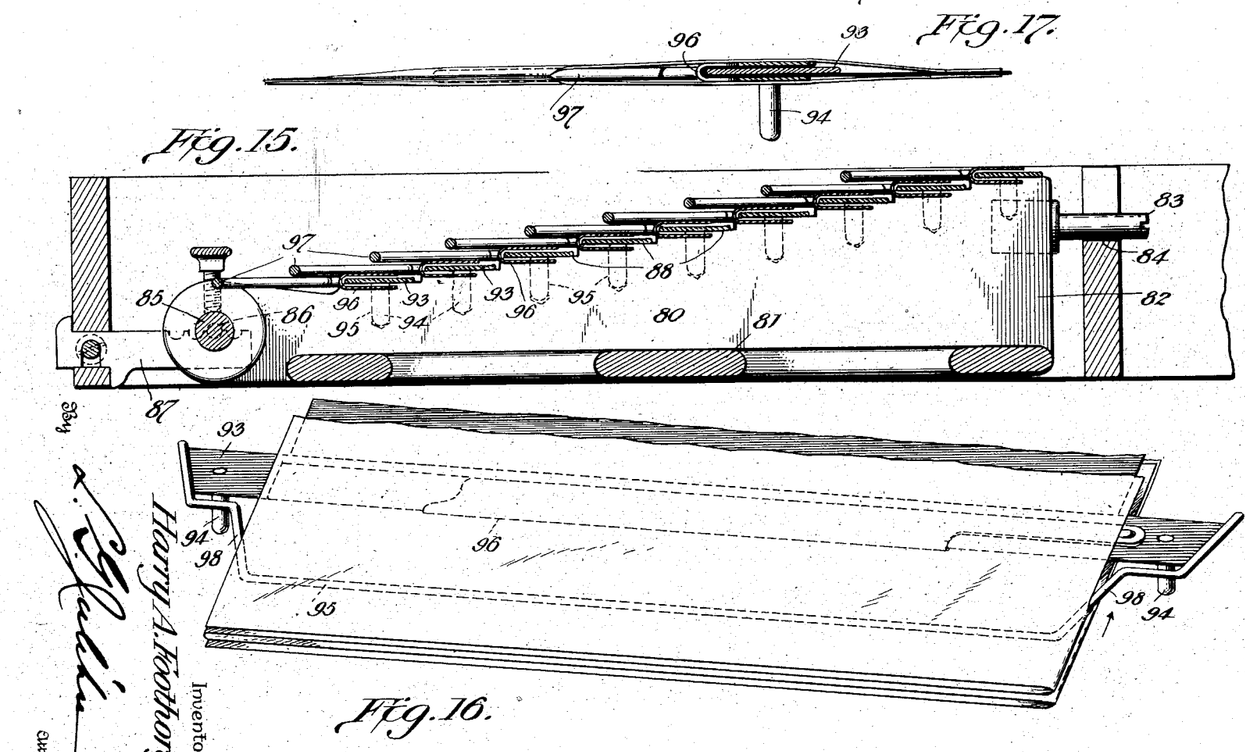
Figure 15 is a longitudinal section of the rear end of Figure 14.
Figure 16 is a detail perspective view showing one of the carbon holding blades provided with a stripper.
Figure 17 is a sectional view of the subject matter of Figure 16.

In Fig. 14 is shown a still further variation for the handling of longitudinally folded strips in either of two ways. That is to say, with either transverse or floating carbons. In this arrangement, the short carbon bars 81 which are supported at one end only are removable and replaced by bars 93 supported at their opposite ends by the seats 88 to which they are secured by pins 94, one at each end of each bar, and extended into an opening 95 in the seat. The bars 93 are each provided with a carbon clamp 96 which may, if desired, accommodate floating carbons, or, if the transverse carbons first described are desired to be used instead of the floating carbons, this may be done because, in the present arrangement, shown in Fig. 14, the stripping of the folded strips along the lines of the longitudinal folds is accomplished before the strips reach the writing area of the platen. This result is obtained by providing each of the bars 93 with a wire bail or stripper 97 extended transversely across the carbon frame, but bent to form oblique fold cutting portions 98 which are disposed in the line of the longitudinal folds of the paper strips, and serve to strip or shear the paper along the lines of the folds as the strip is drawn forward.

The bails or strippers 97 are preferably formed from a single piece of rod-like material which can be bent at its ends to form the oblique fold cutting portions 98. The intermediate part of the bail or stripper 97 is thus spaced from its bar 93 to support the manifold strip in a smoothed out condition as it approaches the portions 98. A stripper constructed in this manner has a two-fold advantage. It prevents strips of thin or otherwise unusually flexible character from sagging or buckling immediately in advance of the cutting portions 98 and thus being torn, and it acts as a connecting guard for the forward ends of said portions 98, which ends if unprotected might dig into and tear such material. It will therefore appear that with this arrangement, the strip, before it reaches the strippers 77, is folded in opposite directions along longitudinal lines but, being separated along the lines of the folds by the strippers, proceeds in separated condition over the writing area and permits, if desired, the use of the transverse transfer elements as well as of the floating carbons accordingly as one or the other may be desired.

It is thought that from the foregoing, the illustrated embodiment of my invention will be clearly understood, but I reserve the right to effect such modifications and variations thereof as may come fairly within the scope of the protection prayed.

What I claim is:

1. The combination with a support, of a flat platen having hinged connection at its front end with the support, and depressible from the writing plane.

2. The combination with a flat platen, of a pair of independently mounted paper clamps, and means common to said clamps and arranged to operate the clamps one after the other.

3. The combination with a flat platen, of a pair of independently mounted paper clamps beyond opposite limits of the writing area and coacting with the platen to hold the work sheets, and clamp operating mechanism common to the clamps and arranged to operate the clamps one after the other.

4. The combination with a flat platen, of front and rear independently mounted paper clamps associated with opposite ends of the platen, and operating means common to the paper clamps and arranged to operate said clamps in succession.

5. The combination with a flat platen, of front and rear independently mounted paper clamps, and operating means common to both clamps and arranged to operate the front clamp to release the paper and to thereafter operate the rear clamp to release the paper.

6. The combination with a flat platen, of paper clamps one of which is arranged to engage and hold the paper beyond one end of the platen, and means for operating one of said clamps and for depressing the platen from the writing plane.

7. The combination with a depressible platen, of a pair of individually movable paper clamps coacting with the platen to hold the work sheets, and mechanism for depressing the platen and operating the clamps to release the work.

8. The combination with a depressible flat platen, of a pair of paper clamps, and means for operating the paper clamps one after the other and for thereafter depressing the platen.

9. The combination with a flat platen movable toward and depressible from the writing plane, of a pair of paper clamps associated with the platen, and means for moving the platen from below the same to the writing plane and for thereafter operating the clamps to engage the paper.

10. The combination with a flat platen movable toward and from the writing plane, of a plurality of paper clamps, means for operating the clamps one after another to release the paper and for moving the platen from the writing plane, and means for returning the platen to the writing plane and for thereafter operating the clamps one after another to grip the paper.

11. The combination with a flat platen mounted to swing from one end but normally located in the writing plane, a plurality of paper clamps normally clamping the paper led over the platen, of means for releasing the clamps in succession and for swinging the platen away from the writing plane, and a spring for retracting the parts to normal position.

12. The combination with a depressible flat platen, and a paper clamp, of rock shafts connected to the platen and clamp respectively, and means for rocking the shafts to operate the clamp and depress the platen.

13. The combination with a flat platen, and a paper clamp, of rock shafts connected to the platen and clamp respectively, and means for operating the rock shafts in succession to effect the operation of the clamp and depression of the platen.

14. The combination with a depressible flat platen, and a plurality of paper clamps, of a rock shaft connected to one clamp, a second rock shaft connected to the other clamp and to the platen, and means for rocking said rock shafts.

15. The combination with a depressible flat platen, and a pair of paper clamps, of a rock shaft connected to one clamp, a second rock shaft connected to the other clamp and to the platen, and means for rocking the shafts to cause the operation of the clamps one after the other and to depress the platen after both clamps have been operated.

16. The combination with a platen, of a paper clamp, including engaging members one of which is in the form of a bar movable transversely toward and from its engaging position and tiltable longitudinally to accommodate irregularities in thickness of the paper clamped.

17. The combination with a vertically movable flat platen, and a pair of paper clamps, of a rock shaft connected to one clamp, a second rock shaft connected to the other lamp and to the platen, an arm mounted to swing from one rock shaft, means for determining the extent of the independent movement of said arm relative to the shaft, a connection between said arm and the other rock shaft, and means for moving the arm to rock the shafts in succession.

18. The combination with a support, of a depressible flat platen therein, and carbon clamps coacting with the support to clamp the carbons fast across the platen, but independently thereof to the support.

19. The combination with a platen, of a supporting frame therefor having carbon pockets, and expansible means spread between opposite walls of the pockets to retain the carbon.

20. The combination with a platen and its supporting frame, of a carbon clamp coacting with the supporting frame and comprising parallel bars, and spreaders intermediate of the bars.

21. A carbon clamp comprising a pair of parallel bars, interfitting members between the bars, means for urging the bars apart, and retracting means for drawing the bars toward each other.

22. The combination with a platen supporting frame, and a platen, of a paper roll supporting frame detachably carried by the platen supporting frame to support a series of paper rolls, and an idler frame movably mounted on the paper roll supporting frame and having a series of idlers over which the paper webs are led from the rolls to the platen said idler frame being movable out of normal position to facilitate the threading of the webs between the idlers.

23. The combination with a platen supporting frame, of a paper roll supporting frame detachably carried by the platen supporting frame, and a hinged idler frame carried by the paper roll supporting frame and equipped with a series of idlers, said idlers being normally disposed in horizontal series but movable to present the series of idlers in vertical position to facilitate the threading of the paper webs.

24. In a machine for writing on a manifold strip in combination with a platen supporting frame and platen over which the strip is fed, of a carbon frame mounted in rear of the platen, carbon supporting bars arranged in stepped series on the frame, and paper strippers and carbon clamps associated with the bars, the paper strippers extending substantially from end to end of their respective bars to maintain the strip in flat condition during the stripping operation.

25. The combination with a depressible flat platen and a pair of paper clamps, of means for causing the operation of the clamps one after the other and for depressing the platen after both clamps have been operated.

26. In a machine for writing on a manifold continuous length strip in combination with a platen supporting frame and platen, over which the strip is fed, of a second frame detachably mounted in the platen supporting frame in rear of the platen and having stepped supports, transverse bars detachably mounted on the supports, and bail shaped slitters carried by the bars and extending from end to end of their respective bars to support the strip.

27. The combination with a platen supporting frame and platen, of a carbon frame detachably mounted in the platen frame and having stepped supports at opposite sides thereof, transversely disposed carbon bars detachably carried by the supports, carbon clamps carried by the bars, and unitary slitters each carried by a bar and bent to form oppositely inclined slitting portions connected together at a point remote from their respective bar.

28. The combination with a platen supporting frame, a of a platen movable toward and from the writing plane, a clamping member separately mounted in the frame and movable toward and from its clamping position, and moving means common to the platen and clamping means and located beneath the platen.

29. The combination with a stationary platen supporting frame, of a platen and a plurality of clamps, each having a separate movable mounting in the frame but coacting to support and retain work sheets or elements in position to be written upon, and operating means mounted in the frame and common to the platen and clamps.

30. The combination with a stationary platen supporting frame, of a flat platen mounted in the frame to swing toward and from the writing plane, a clamping member movably mounted in the frame and coacting with the platen in the support and retention of the work sheets or elements, and means mounted in the frame and operative to swing the platen and to move the clamp.

31. The combination with a stationary platen supporting frame, of a flat platen mounted to swing within the frame, clamps movably mounted in the frame adjacent to opposite edges of the platen and movable toward and from their clamping positions, and operating means common to the platen and to a clamp.

32. The combination with a stationary platen supporting frame, of a flat platen mounted to swing within the frame, clamps movably mounted in the frame adjacent to opposite edges of the platen and movable in the frame toward and from their clamping positions, and means mounted in the frame and operative to swing the platen and to operate the clamps.

33. The combination with a platen-supporting frame, of a platen having a hinged mounting at one end thereof within the frame, a clamping member movably mounted in the frame and coacting with the hinged end of the platen, and means mounted in the frame and operative to swing the platen and to operate the clamp.

34. In a typewriter, in combination, a support, flat platen adjustable toward and from the writing plane, clamps upon the support adjacent different edges of the platen and an operating mechanism common to the platen and the clamps and adapted for raising the platen and then adjusting the clamps successively.

35. In a machine of the character described, a flat platen for supporting a continuous manifold strip of material as it is fed thereover, said platen being hinged for movement toward the writing plane, clamps relatively arranged to clamp the strip upon the platen at different points in the length of the strip, and means for moving the platen toward said plane and for operating the clamps in successive order corresponding in direction to the direction in which the strip is fed to facilitate expelling air from between the folds of the strip.

36. In a machine of the class described, in combination, a flat platen for supporting a continuous length manifold strip as it is fed thereover, said platen being movable toward or from a writing plane, clamps for clamping the strip in position relative to the platen, one of the clamps being arranged to engage and hold the strip beyond one edge of the platen, and means for moving the platen in one direction and thereafter operating the clamps in successive order corresponding in direction to the direction in which the strip is fed.

37. In a machine for writng on a manifold continuous length strip, a support, a flat platen over which the strip is designed to be fed, a clamp operable to clamp the strip against one edge of the platen, and a hinge connection between said edge of the platen and the support permitting the platen to be swung toward and from a writing plane and including provision for a separate adjustment of said edge of the platen relative to said clamp in accordance with the thickness of the strip.

38. In a machine for writing on a manifold continuous length strip, in combination, a platen over which the strip is designed to be fed, a frame supporting the platen, a second frame mounted in the platen supporting frame, transverse bars mounted on the second frame in superposed relation, devices for attaching carbon sheets to the bars, and rod-like slitters one for each bar substantially coextensive in length therewith and bent to form oppositely inclined slitting portions.

In testimony whereof I hereunto affix my signature.

HARRY ARTHUR FOOTHORAP.